United States Patent
Didcock

(10) Patent No.: US 11,849,163 B2
(45) Date of Patent: Dec. 19, 2023

(54) REDUNDANT VIDEO STREAM GENERATION

(71) Applicant: Meta Platforms, Inc., Menlo Park, CA (US)

(72) Inventor: Clifford Neil Didcock, Bainbridge Island, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/514,732

(22) Filed: Oct. 29, 2021

(65) Prior Publication Data

US 2023/0135218 A1 May 4, 2023

(51) Int. Cl.
*H04N 21/24* (2011.01)
*H04L 65/70* (2022.01)
*H04N 21/2187* (2011.01)
*H04N 21/258* (2011.01)

(52) U.S. Cl.
CPC ......... *H04N 21/2402* (2013.01); *H04L 65/70* (2022.05); *H04N 21/2187* (2013.01); *H04N 21/25891* (2013.01)

(58) Field of Classification Search
CPC ........... H04N 21/2402; H04N 21/2187; H04N 21/25891; H04L 65/70
See application file for complete search history.

(56) References Cited

U.S. PATENT DOCUMENTS

| 8,559,426 B2 | 10/2013 | Lear et al. |
| 9,704,393 B2 | 7/2017 | Acharya et al. |
| 10,721,499 B2 | 7/2020 | Chang et al. |
| 2002/0046405 A1 | 4/2002 | Lahr |
| 2006/0002552 A1 | 1/2006 | LeComte et al. |
| 2012/0066355 A1* | 3/2012 | Tiwari ................. H04L 65/612 709/228 |
| 2014/0123028 A1* | 5/2014 | Kamity .............. H04N 21/4788 715/753 |
| 2017/0142450 A1* | 5/2017 | Ghosal ............... H04N 21/2183 |
| 2019/0132275 A1* | 5/2019 | Kelly .................... H04L 65/611 |
| 2021/0176300 A1* | 6/2021 | Balasubramanian ... H04L 45/22 |

OTHER PUBLICATIONS

Ballast S, "Free Method—OBS Live Stream to Facebook and YouTube at the Same Time," 1 page, Retrieved from the Internet: URL: https://www.youtube.com/watch?v=2L4_LH_wFMg uploaded on Sep. 16, 2020.

(Continued)

*Primary Examiner* — Caroline H Jahnige

(74) *Attorney, Agent, or Firm* — Greenberg Traurig, LLP

(57) ABSTRACT

The disclosed computer-implemented method may include discovering, by a computer processor and based on user information, that an identity of a user generating a live broadcast is enabled for dual streaming. The method may also include determining, by the computer processor and based at least in part on available network bandwidth, that the live broadcast is authorized for dual streaming. The method may further include transmitting separately, by the computer processor at least partly in response to the discovery and the determination, streams of the live broadcast to a plurality of different network nodes of a streaming platform. Various other methods, systems, and computer-readable media are also disclosed.

20 Claims, 6 Drawing Sheets

(56) References Cited

OTHER PUBLICATIONS

"Live Stream in Minutes, not Hours," Intel® Easy Streaming Wizard, 4 pages, Retrieved from the Internet: URL: https://www.intel.com/content/www/us/en/gaming/easy-streaming-wizard.html on Oct. 26, 2021.
International Search Report and Written Opinion for International Application No. PCT/US2022/048317, dated Feb. 2, 2023, 10 pages.

* cited by examiner

REDUNDANT VIDEO STREAM GENERATION

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
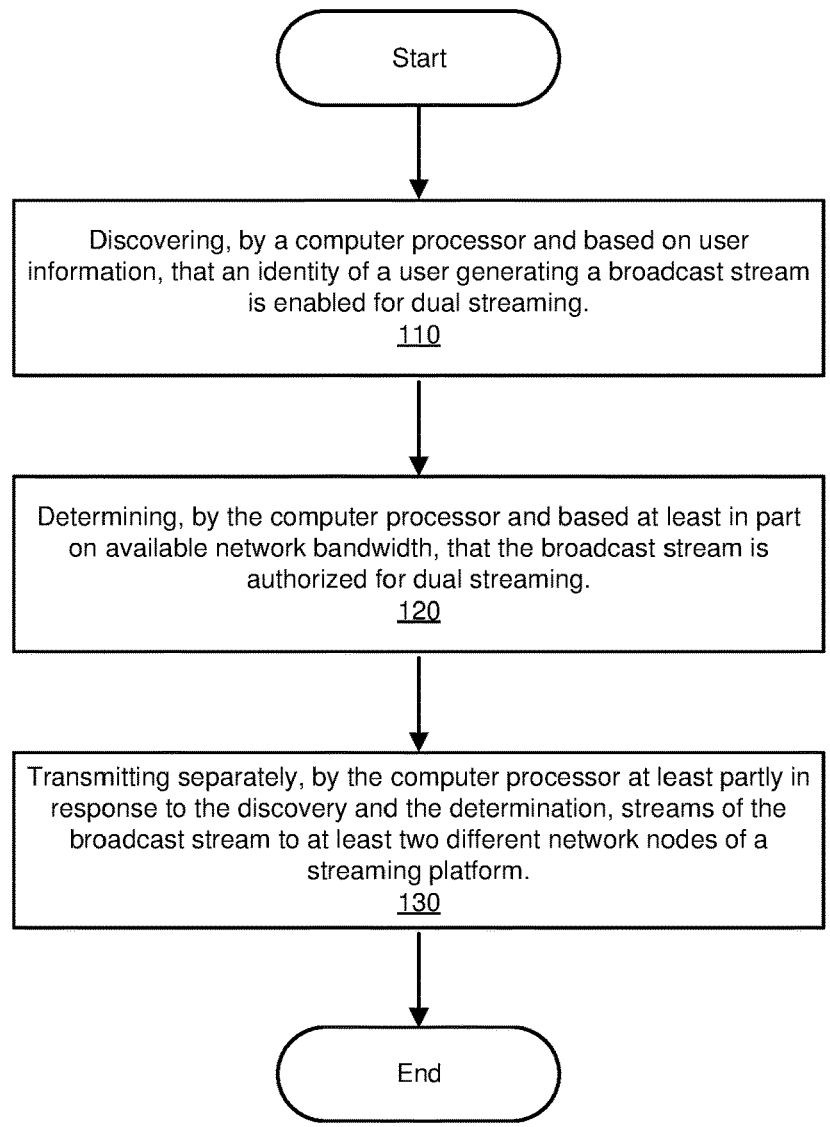
FIG. 1 is a flow diagram of an exemplary method for redundant video stream generation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Streaming platforms may allow users to broadcast livestream events, performances, and gatherings on social media platforms. Some streaming platforms may support broadcasters sending two identical video streams to increase reliability. For example, a primary and backup video stream approach may be employed. Separate recording devices may be used to stream to different points of presence of the streaming platform over different networks for maximum redundancy. Setting up and producing dual streams, however, is not a simple task for broadcasters, and relatively few broadcasts use dual streaming.

Redundant streams represent an additional processing and network cost, so it may not be appropriate for every live broadcast to send redundant streams. However, reliability for important broadcasts may be increased if more live broadcasts ingest dual redundant streams. The advantages of increased use of dual streams may be achieved in part by simplifying the dual streaming process and enabling the streaming platform to play a role in selecting which broadcasts are enabled for dual streams.

The present disclosure is generally directed to redundant video stream generation. As will be explained in greater detail below, embodiments of the present disclosure may automatically establish dual streams in response to determining that there is sufficient bandwidth and based on enablement of dual streaming for a user by a streaming platform. For example, a computing system may discover, based on user information, that an identity of a user generating a live broadcast is enabled for dual streaming, and determine, based at least in part on available network bandwidth, that the live broadcast is authorized for dual streaming. The computing system may respond to the discovery and the determination by transmitting streams of the live broadcast separately to a plurality of different network nodes of a streaming platform. The transmission may also be performed in response to a user preference for dual streaming.

In some implementations, a recording device generating a live broadcast stream may automatically perform the dual streaming. For example, at the start of the live broadcast, a processor of the recording device may identify two or more regional points of presence of a streaming platform that are most proximate to the recording device in terms of network connectivity. Additionally, the computing system may consult with the streaming platform to determine if dual streaming is enabled for the user based on a historical number of viewers, and to discover if the streaming platform network has enough bandwidth available and/or cloud compute resource available to support dual streaming at this time. The computing system may also analyze a regional network bandwidth availability for the recording device. In this case, the determination that the live broadcast is authorized for dual streaming may be based on the regional network bandwidth availability, and the transmission may also be in response to the streaming platform network bandwidth being sufficient to support dual streaming at this time. If a user preference for dual streaming is not stored on the recording device, then the processor may prompt the user for the preference and store it for future reference. In this way, generation of a redundant stream may occur automatically with little or no effort on the part of the broadcaster, and the streaming platform can ensure that dual streaming is used for important broadcasts when the platform bandwidth can support the dual streams.

In additional or alternative implementations, a point of presence of a streaming platform may automatically perform the dual streaming. For example, a computer processor of the point of presence may receive a live broadcast stream from a recording device over a regional network. Additionally, the processor may communicate with a data center of the streaming platform to discover streaming platform network bandwidth availability and/or cloud compute resource availability and whether the broadcaster is enabled for dual streaming based on historical number of viewers. In this case, the determination that the live broadcast is authorized for dual streaming may be based at least in part on the streaming network bandwidth availability, and the transmission of the separate broadcast streams may be to two different data centers. Alternatively or additionally, the point of presence may transmit one of the streams to another point of presence for relay to a data center. In this way, a point of presence may increase redundancy for a broadcast stream without any activity or involvement on the part of the broadcaster. Additionally, the point of presence alleviates the need for additional bandwidth from the broadcasting user to the point of presence.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-6, detailed descriptions of systems and methods for redundant video stream generation. Detailed descriptions of an exemplary method and system for redundant video stream generation are provided with reference to FIGS. 1 and 2. Detailed descriptions of an exemplary network implementing redundant video stream generation are provided with reference to FIG. 3. Detailed descriptions of an exemplary recording device performing redundant video stream generation are provided with reference to FIG. 4. Detailed descriptions of an exemplary streaming platform point of presence performing redundant video stream generation are provided with reference to FIGS. 5 and 6.

FIG. 1 is a flow diagram of an exemplary computer-implemented method 100 for redundant video stream generation. The steps shown in FIG. 1 may be performed by any suitable computer-executable code and/or computing system, including the system(s) illustrated in FIG. 2. In one example, each of the steps shown in FIG. 1 may represent an algorithm whose structure includes and/or is represented by multiple sub-steps, examples of which will be provided in greater detail below.

As illustrated in FIG. 1, a method 100 of redundant video stream generation begins at step 110. The systems described herein may perform step 110 in a variety of ways. In one example, step 110 may include discovering, by a computer processor and based on user information, that an identity of a user generating a live broadcast is enabled for dual streaming. In some implementations, the processor may communicate with a network node of a streaming platform, such as a point of presence and/or a data center, and receive a decision from the streaming platform based on various criteria, such as historical viewer count for the broadcasts of the user, virality of the current broadcast stream, strategic value of the broadcast stream, etc.

As used herein, the term "user information" may generally refer, without limitation, to information transferred across a functional interface between a source user and a telecommunications system. For example, the term "user information" may refer, without limitation, to a user ID, user profile information, combinations thereof, etc.

As used herein, the term "user identity" may generally refer, without limitation, to information that identifies a broadcaster to a streaming platform service. For example, the term "user identity" may refer, without limitation, to a user ID associated with a streaming platform user account, an ID of a recording device, a network address, etc.

As used herein, the term "live broadcast" may generally refer, without limitation, to various types of media that may be broadcast without a significant delay. For example, the term "live broadcast" may refer, without limitation, to a news program or a news broadcasting, live television, internet television, internet radio liveblogging, live streaming, and/or Instagram Live.

As used herein, the term "dual streaming" may generally refer, without limitation, to delivery of two independent streams of live video and/or audio over at least partly independent network resources. The two streams may sometimes be separately configured for different frame rates and video resolutions. Conversely, terms such as "dual system streaming" and "dual PC streaming" refers to generating a single video stream using multiple systems to reduce workload; these terms should not be confused with "dual streaming."

As used herein, the term "network node" may generally refer, without limitation, to an electronic device that is attached to a network, and is capable of creating, receiving, or transmitting information over a communication channel. For example, the term "network node" may refer, without limitation, to a point of presence and/or data center of a streaming platform.

As used herein, the term "streaming platform" may generally refer, without limitation, to an on-demand online entertainment source for TV shows, movies, and other streaming media. For example, the term "streaming platform" may refer, without limitation, to live streaming services provided by Vimeo, YouTube, Facebook, Instagram, and Twitch, etc.

As used herein, the term "point of presence" may generally refer, without limitation, to an artificial demarcation point or interface point between communicating entities. For example, the term "point of presence" may refer, without limitation, to an Internet service provider (ISP) point of presence, the local access point that allows users to connect to the Internet with their ISP. ISPs typically have multiple points of presence which are often located at Internet exchange points and colocation centers. In these and other contexts, a point of presence is any demarcation point, access point, or physical location at which two or more networks or communication devices share a connection. Example devices include routers, switches, servers, and other devices necessary for traffic to cross over networks.

As used herein, the term "data center" may generally refer, without limitation, to a building, a dedicated space within a building, or a group of buildings used to house computer systems and associated components, such as telecommunications and storage systems. For example, the term "data center" may refer, without limitation, to facilities capable of operating and managing a carrier's telecommunication network, providing data center based applications directly to the carrier's customers, providing hosted applications for a third party to provide services to their customers, and providing a combination of these and similar data center applications.

As used herein, the term "historical viewer count" may generally refer, without limitation, to a number of concurrent viewers measured during previous broadcasts by a particular broadcaster. For example, the term "historical viewer count" may refer, without limitation, to a maximum number of concurrent viewers of a previous broadcast, an average of maximum numbers of concurrent viewers for a number of previous broadcasts, an average number of concurrent viewers observed during previous broadcasts, etc.

As used herein, the term "virality" may generally refer, without limitation, to the tendency of an image, video, or piece of information to be circulated rapidly and widely from one internet user to another. For example, the term "virality" may refer, without limitation, to a number of concurrent viewers of a current broadcast, a rate of increase in the number of concurrent viewers of the current broadcast, etc. Accordingly, a broadcast may be dual streamed automatically based on virality even if a historical viewer count is low or unavailable.

As used herein, the term "strategic value" may generally refer, without limitation, to a value of a broadcast to a streaming platform. For example, the term "strategic value" may refer, without limitation, to an identity of a broadcaster (e.g., a streaming platform executive, an advertiser, an expert, etc.), type of broadcast content (e.g., help videos for streaming platform users, advertising, etc.), combinations thereof, etc.

Processing may proceed from step 110 to step 120. The systems described herein may perform step 120 in any suitable manner. In one example, step 120 may include determining, by the computer processor and based at least in part on available network bandwidth, that the live broadcast is authorized for dual streaming. In some implementations, the available network bandwidth may correspond to a bandwidth of a regional network connecting a recording device to regional points of presence of a streaming platform. In additional or alternative implementations, the available network bandwidth may correspond to a bandwidth of the streaming platform. These alternatives are described later with reference to FIGS. 4-6.

As used herein, the term "available network bandwidth" may generally refer, without limitation, to a measurement indicating the maximum capacity of a wired or wireless communications link to transmit data over a network connection in a given amount of time. For example, the term "available network bandwidth" may refer, without limitation, to a number of bits, kilobits, megabits, or gigabits that can be transmitted in one second.

As used herein, the term "available cloud compute resource" may generally refer, without limitation, to a service that provides virtual equipment (Compute Resources) by combining CPUs, memory, and disks to create virtual machines. Compute Resources may be provided by virtualizing physical servers and storage devices shared by multiple users.

As used herein, the term "regional network" may generally refer, without limitation, to a communication network connecting an encoder to a point of presence of a streaming platform. For example, the term "regional network" may refer, without limitation, to a wired or wireless network to which a broadcasting recording device can connect and over which it can livestream a broadcast to a point of presence of a streaming platform.

As used herein, the term "regional points of presence" may generally refer, without limitation, to points of presence of a streaming platform to which a broadcasting recording device can livestream a broadcast over a regional network. For example, the term "regional points of presence" may refer, without limitation, to any demarcation point, access point, or physical location at which the streaming platform and the regional network share a connection.

Processing may proceed from step 120 to step 130. The systems described herein may perform step 130 in any suitable manner. In one example, step 130 may include transmitting separately, by the computer processor at least partly in response to the discovery and the determination, streams of the live broadcast to a plurality of different network nodes of a streaming platform. In some implementations, a recording device may transmit the separate streams over a regional network to two different regional points of presence of the streaming platform. In additional or alternative implementations, a regional point of presence of the streaming platform may transmit the separate streams to two different data centers of the streaming platform. These alternatives are described later with reference to FIGS. 4-6.

Figure 2:
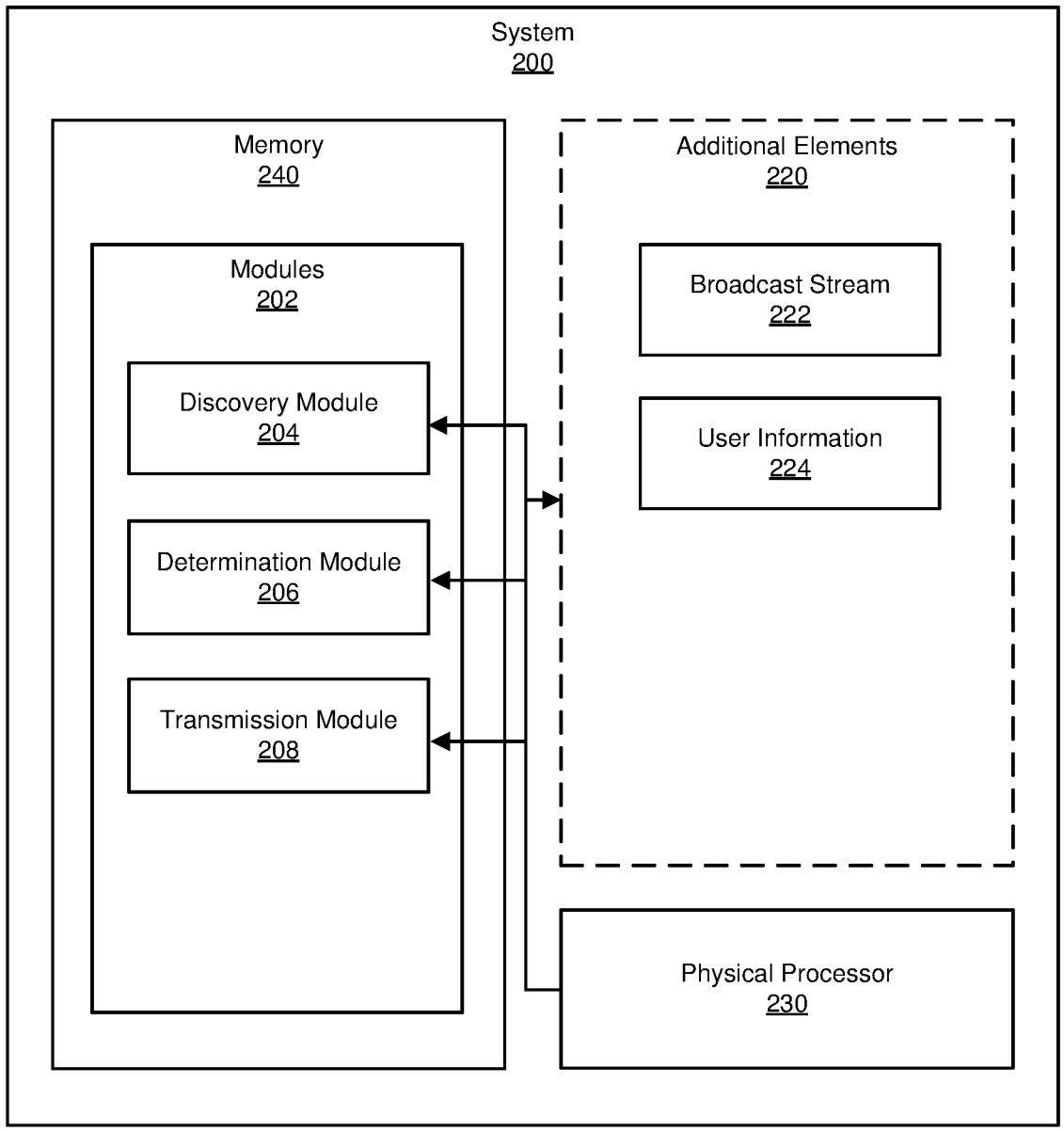
FIG. 2 is a block diagram of an exemplary system for redundant video stream generation.

A redundant video stream generation system may be implemented in any suitable manner. Turning to FIG. 2, an exemplary system 200 includes at least one physical processor 230, physical memory 240 comprising computer-executable instructions such as modules 202, and additional elements 220, such as a broadcast stream 222 and/or user information 224. For example, user information 224 may include a user account ID for a streaming platform, and this user account ID may correspond to an identity of the user when discovering if a live broadcast is approved for dual streaming. When executed by the physical processor 230, the modules 202 cause physical processor 230 to carry out various operations. For example, discovery module 204 may execute procedures described above with reference to step 110 of method 100 of FIG. 1. Additionally, determination module 206 may execute procedures described above with reference to step 120 of method 100 of FIG. 1. Also, transmission module 208 may execute procedures described above with reference to step 130 of method 100 of FIG. 1. Further, modules 204-206 may perform additional operations as detailed below with reference to FIGS. 4-6.

Figure 3:
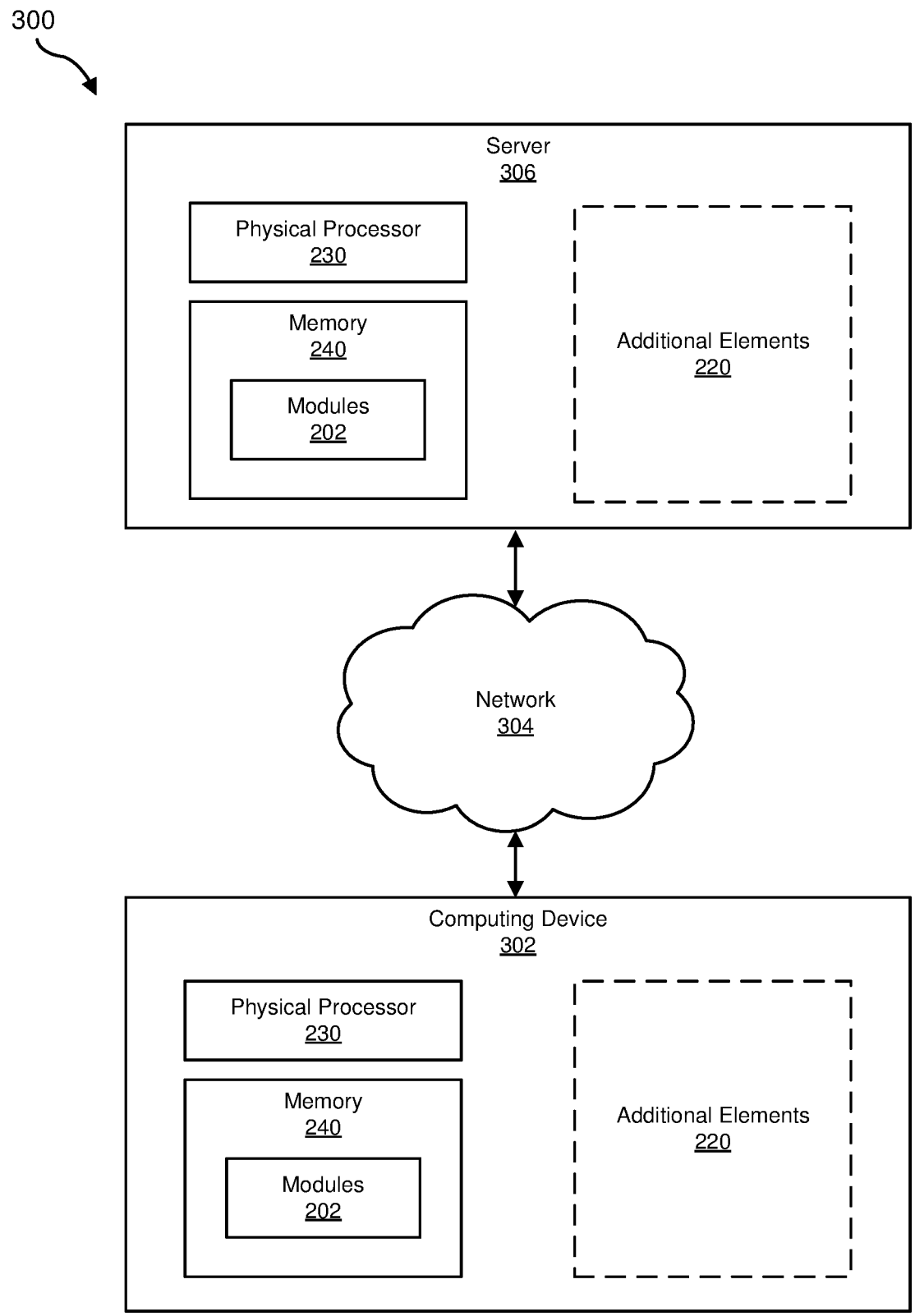
FIG. 3 is a block diagram of an exemplary network for redundant video stream generation.

Example system 200 in FIG. 2 may be implemented in a variety of ways. For example, all or a portion of example system 200 may represent portions of example system 300 in FIG. 3. As shown in FIG. 3, system 300 may include a computing device 302 in communication with a server 306 via a network 304. In one example, all or a portion of the functionality of modules 202 may be performed by computing device 302, server 306, and/or any other suitable computing system. As will be described in greater detail below, one or more of modules 202 from FIG. 2 may, when executed by at least one processor of computing device 302 and/or server 306, enable computing device 302 and/or server 306 to perform redundant video stream generation. For example, and as will be described in greater detail below, one or more of modules 202 may cause computing device 302 and/or server 306 to discover that an identity of a user generating a live broadcast is enabled for dual streaming, determine, based on available network bandwidth, that the live broadcast is authorized for dual streaming, and respond to the discovery and the determination by separately transmitting streams of the live broadcast to a plurality of different network nodes of a streaming platform.

Figure 4:
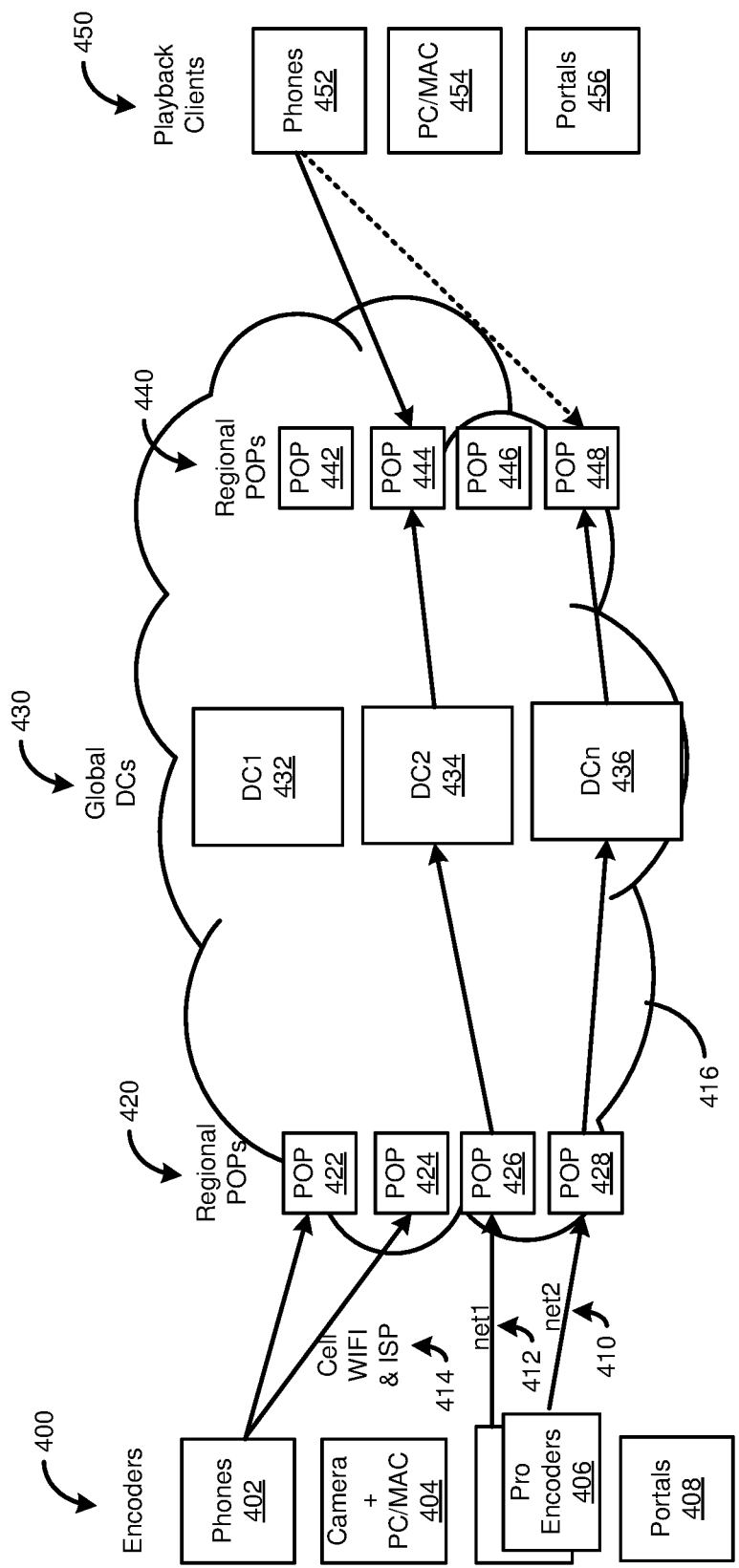
FIG. 4 is a block diagram illustrating a recording device performing redundant video stream generation.

Turning to FIG. 4, the computing device that performs the redundant video stream generation may correspond to a recording device in some implementations. For example, encoders 400 may include mobile phones 402, a camera and PC/MAC 404, professional encoders 406 (e.g., TV cameras), and/or portals 408. As discussed previously, professional encoders 406 may transmit dual streams over separate networks 410 and 412 to network nodes of a streaming platform, such as two or more of regional points of presence (POP) 420, including POPs 422-428. In the example shown in FIG. 4, the professional encoders separately transmit video streams over networks 410 and 412 to POP 426 and 428. In turn, POPs 426 and 428 may transmit the streams to two or more of data centers (DC) 430, which may include DCs 432-436. In the example shown in FIG. 4, the POPs 426 and 428 may transmit the streams to DCs 434 and 436. The DCs 432 and 436 may then transmit the streams to downstream POPs 440, such as any of POPs 442-448. In the example shown in FIG. 4, DCs 434 and 436 transmit the streams to POPs 444 and 448. Playback clients 450, such as phones 452, PC/MAC 454, and/or portals 456, may then obtain either of the streams from POPs 444 and 448.

In contrast to professional encoders 406 that may transmit over separate regional networks, recording devices such as mobile phones 402 may implement automatic redundant video stream generation that may transmit the streams over a same regional network 414. Thus, the computer processor may correspond to a processor of a recording device employed by the user to generate the live broadcast. In this example, any one or combination of modules 204, 206, and/or 208 may cause physical processor 230 to analyze a regional network bandwidth availability for the recording device, in which case the determination that the live broadcast is authorized for dual streaming may be based at least in part on the regional network bandwidth availability. The analysis of the regional network bandwidth availability may occur, for example, by using a test stream before beginning a live broadcast or parallel therewith to gather data and metrics (e.g., round trip time) indicative of available bandwidth for the regional network 414. Alternatively or additionally, the analysis may occur during the live broadcast by gathering the data and metrics for the live broadcast stream.

In the above example, any one or combination of modules 204, 206, and/or 208 may cause physical processor 230 to identify, at a start of the live broadcast, at least two different regional POPs 422 and 424 of the plurality of POPS 420 based on proximity thereof to the recording device, such as mobile phone 402. This proximity may be assessed in terms of network connectivity of the regional network 414 connecting the recording device to the at least two different regional POPs 422 and 424. In this instance, the plurality of different network nodes to which the transmission occurs corresponds to the at least two different regional POPs 422 and 424. These POPs 422 and 424 may then transmit the received broadcast streams to two different data centers for downstream delivery to playback clients 450 via downstream regional POPs 440.

Alternatively or additionally, any one or combination of modules 204, 206, and/or 208 may cause physical processor 230 to discover that the live broadcast is approved for dual streaming based on communications with the streaming platform 416 regarding streaming platform network bandwidth availability. For example, mobile phone 402 may query either or both POPs 422 and 424 to seek approval for dual streaming of the live broadcast. In such cases, the transmission may occur further in response to the approval based on streaming platform network bandwidth availability.

Alternatively or additionally, any one or combination of modules 204, 206, and/or 208 may cause physical processor 230 to determine a user preference for dual streaming. For example, the physical processor 230 may reference user information 224 stored on the mobile phone 402, for example, as part of a user profile for a live streaming account for the streaming platform 116. Alternatively or additionally, the determination of the user preference may correspond to prompting the user for the user preference and storing the user preference for future reference as part of user information 224. In such cases, the transmission may occur further in response to the user preference for dual streaming.

Figure 5:
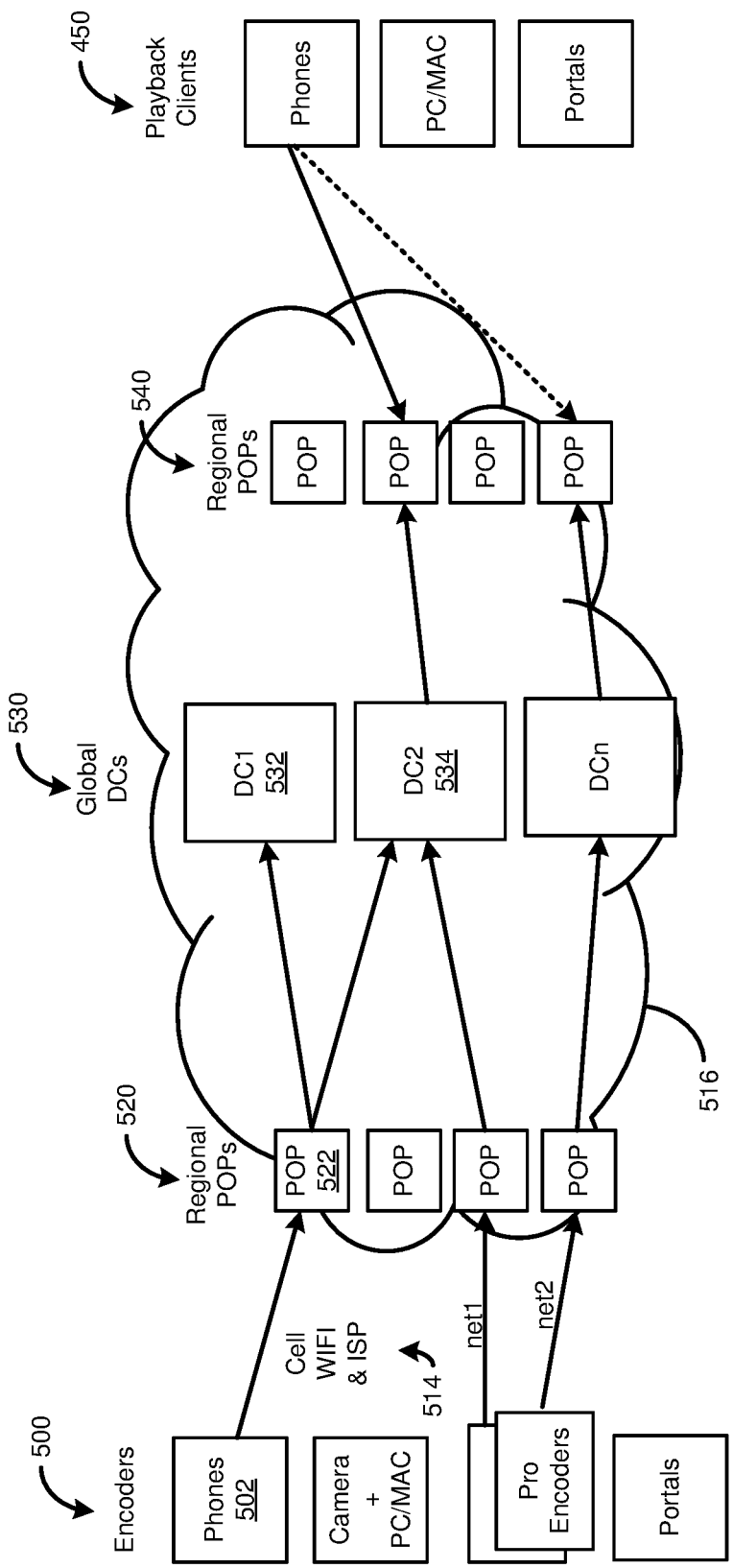
FIG. 5 is a block diagram illustrating a point of presence of a streaming platform performing redundant video stream generation.

Turning to FIG. 5, the computer processor may correspond to a processor of a regional POP 422 of the streaming platform 416 in some implementations. In such implementations, any one or combination of modules 204, 206, and/or 208 may cause physical processor 230 to receive the live broadcast from a recording device (e.g., mobile phone 502) over a regional network (e.g., network 514). In such implementations, any one or combination of modules 204, 206, and/or 208 may cause physical processor 230 to discover streaming platform network bandwidth availability. In such cases, the determination that the live broadcast is authorized for dual streaming may be based at least in part on the streaming network bandwidth availability.

The regional POP 522 may determine the available bandwidth of the streaming platform 516 in a variety of ways. For example, the regional POP 522 may query one or more data centers 530 for data and/or metrics as previously described. Alternatively or additionally, the regional POP 522 may reference locally stored data and/or metrics that may be pushed to the regional POP 522 from the data centers 530 and/or gathered by the regional POP based on other broadcast streams recently managed by the regional POP 522.

It should be understood that this implementation may be combined with the implementation described above with reference to FIG. 4, in that the regional POP 522 may perform the dual streaming even though the mobile phone 502 chose not to perform the dual streaming. For example, the regional network 514 may not have sufficiently available bandwidth to support dual streaming. Thus, when regional POP 500 receives the broadcast stream, it may be informed by the mobile phone 502 that the user preference is for dual streaming, but that dual streaming was not performed by the mobile phone 502. Alternatively, the regional POP 522 may perform the dual streaming without reference to any user preference.

In some instances, the regional POP 522 may transmit the dual streams to a plurality of different network nodes of the streaming platform 516 that correspond to at least two different data centers 532 and 534 of the streaming platform 516. The regional POP 522 may inform the data centers 532 and 534 that the dual streams are redundant so that the data centers 532 and 534 may avoid relaying the redundant streams to the same downstream POP of POPs 540. In this way, playback clients 550 may obtain redundant streams from different POPs of downstream POPs 540 with little or no user effort.

Figure 6:
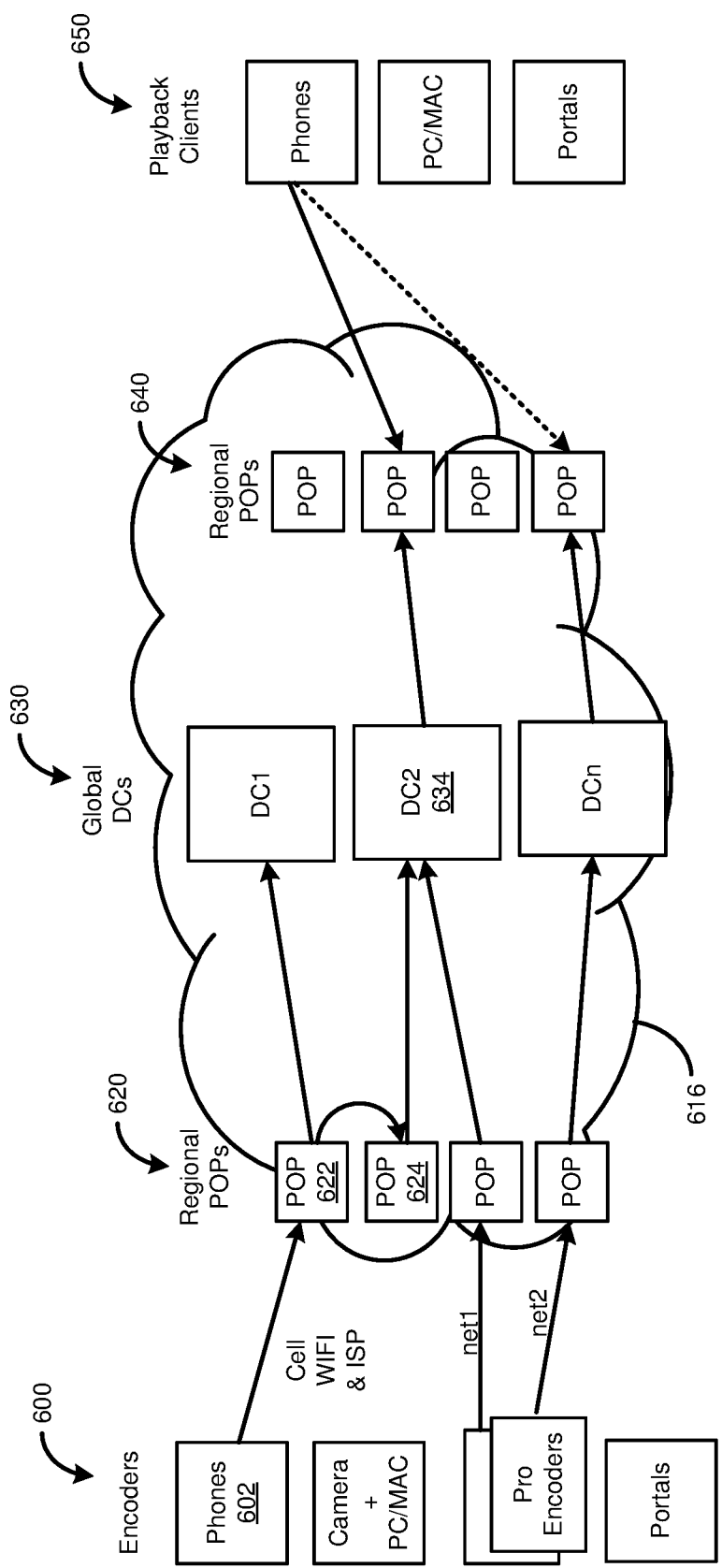
FIG. 6 is a block diagram illustrating a point of presence of a streaming platform performing redundant video stream generation.

Turning to FIG. 6, a regional POP 622 may perform transmission to at least one data center 634 of the at least two data centers 630 indirectly through another regional POP 624 of the streaming platform 616. For example, if the regional POP 622 does not know if the mobile phone 602 performed dual streaming, it may yet determine that POP 624 is a next most proximate regional POP to mobile phone 602, and thus would be another POP to which the mobile phone 602 may have transmitted a redundant stream. Transmitting the redundant stream to this POP 624 and informing the other POP 624 that it is a redundant stream allows the other POP 624 to decide whether to relay the redundant stream downstream to data center 634, and this decision may be conditioned on whether the POP 624 is already receiving a redundant stream from mobile phone 602. In another example, the regional POP 622 may choose to relay the redundant stream through the other POP 624 because the other POP 624 has access to a partitioned subnet or other resources that are not available to POP 622. Such a relay through POP 624 may additionally or alternatively avoid causing detection of an error by data centers 630, where such an error may otherwise be generated in response to receipt of redundant streams from a same regional POP. In this way, playback clients 650 may obtain redundant streams from different POPs of downstream POPs 640 with little or no user effort.

As described above, automatic establishment of dual streams may be performed in response to determining that there is sufficient bandwidth and based on user preference, where the system may prompt the user for the preference if no preference was previously established. For example, the above-described systems and methods may involve detecting, by a computing device, initialization of a broadcast by a user of the computing device, and analyzing, by the computing device in response to the detecting, available network bandwidth for a recording device for the broadcast. The systems and methods may also involve determining, by the computing device based on the analyzing, that the bandwidth is sufficient to support dual streams, and transmitting, by the computing device in response to the determining and based on a user preference, all video and audio of the broadcast to at least two network nodes (e.g., points of presence and/or data centers) of a streaming platform. In some implementations, the computing device may identify the two most proximate POPs at the start of any live broadcast, discover through communications with the streaming platform if the identity of the user broadcasting is enabled for dual streaming (based on factors like historical viewer count), and discover if live streaming platform resources, at the current point in time, are such that this broadcaster is approved for dual streaming. This decision may be based on current computing and network bandwidth availability within the streaming platform's infrastructure. Advantageously, the disclosed systems and methods simplify the dual streaming process for broadcasters and selects which broadcasts are enabled for dual-streams, thus increasing reliability for important broadcasts while avoiding additional processing and network cost that would result from enabling dual-streams for all broadcasts.

EXAMPLE EMBODIMENTS

Example 1: A computer-implemented method may include discovering, by a computer processor and based on user information, that an identity of a user generating a live broadcast is enabled for dual streaming; determining, by the computer processor and based at least in part on available network bandwidth, that the live broadcast is authorized for dual streaming; and transmitting separately, by the computer processor at least partly in response to the discovery and the determination, streams of the live broadcast to a plurality of different network nodes of a streaming platform.

Example 2: The method of example 1, wherein the computer processor corresponds to a processor of a recording device employed by the user to generate the live broadcast, the method further comprising: analyzing, by the computer processor, a regional network bandwidth availability for the recording device, wherein the determination that the live broadcast is authorized for dual streaming is based at least in part on the regional network bandwidth availability.

Example 3: The method any of examples 1 or 2, further comprising: identifying, by the computer processor at a start of the live broadcast, at least two different regional points of presence of the plurality of points of presence based on proximity thereof to the recording device in terms of network connectivity of the regional network connecting the recording device to the at least two different regional points of presence, wherein the plurality of different network nodes corresponds to the at least two different regional points of presence.

Example 4: The method any of examples 1 to 3, further comprising: discovering, by the computer processor based on communications with the streaming platform regarding streaming platform network bandwidth availability, that the live broadcast is approved for dual streaming, wherein the transmission occurs further in response to the approval based on streaming platform network bandwidth availability.

Example 5: The method any of examples 1 to 4, further comprising: determining, by the computer processor, a user preference for dual streaming, wherein the transmission occurs further in response to the user preference for dual streaming.

Example 6: The method any of examples 1 to 5, wherein the determination of the user preference corresponds to prompting the user for the user preference and storing the user preference for future reference.

Example 7: The method any of examples 1 to 6, wherein the computer processor corresponds to a processor of a point of presence of the streaming platform, the method further comprising: receiving, by the computer processor, the live broadcast from a recording device over a regional network; and discovering, by the computer processor, streaming platform network bandwidth availability, wherein the determination that the live broadcast is authorized for dual streaming is based at least in part on the streaming network bandwidth availability.

Example 8: The method any of examples 1 to 7, wherein the plurality of different network nodes of the streaming platform corresponds to at least two different data centers of the streaming platform.

Example 9: The method any of examples 1 to 8, wherein the transmission to at least one data center of the at least two data centers occurs indirectly through another regional point of presence of the streaming platform.

Example 10: A system comprising: at least one physical processor; and physical memory comprising computer-executable instructions that, when executed by the physical processor, cause the physical processor to: discover, based on user information, that an identity of a user generating a live broadcast is enabled for dual streaming; determine, based at least in part on available network bandwidth, that the live broadcast is authorized for dual streaming; and transmit separately, at least partly in response to the discovery and the determination, streams of the live broadcast to a plurality of different network nodes of a streaming platform.

Example 11: The system of example 10, wherein the at least one physical processor corresponds to a processor of a recording device employed by the user to generate the live broadcast, and the computer-executable instructions further cause the at least one physical processor to: analyze a regional network bandwidth availability for the recording device, wherein the determination that the live broadcast is authorized for dual streaming is based at least in part on the regional network bandwidth availability.

Example 12: The system of example 10 or example 11, wherein the computer-executable instructions further cause the at least one physical processor to: identify, at a start of the live broadcast, at least two different regional points of presence of the plurality of points of presence based on proximity thereof to the recording device in terms of network connectivity of the regional network connecting the recording device to the at least two different regional points of presence, wherein the plurality of different network nodes corresponds to the at least two different regional points of presence.

Example 13: The system of any of examples 10 to 12, wherein the computer-executable instructions further cause the at least one physical processor to: discover, by the computer processor based on communications with the streaming platform regarding streaming platform network bandwidth availability, that the live broadcast is approved for dual streaming, wherein the transmission occurs further in response to the approval based on streaming platform network bandwidth availability.

Example 14: The system of any of examples 10 to 13, wherein the computer-executable instructions further cause the at least one physical processor to: determine a user preference for dual streaming, wherein the transmission occurs further in response to the user preference for dual streaming.

Example 15: The system of any of examples 10 to 14, wherein the determination of the user preference corresponds to prompting the user for the user preference and storing the user preference for future reference.

Example 16: The system of any of examples 10 to 15, wherein the at least one physical processor corresponds to a processor of a point of presence of the streaming platform, and the computer-executable instructions further cause the at least one physical processor to: receive the live broadcast from a recording device over a regional network; and discover streaming platform network bandwidth availability, wherein the determination that the live broadcast is authorized for dual streaming is based at least in part on the streaming network bandwidth availability.

Example 17: The system of any of examples 10 to 16, wherein the plurality of different network nodes of the streaming platform corresponds to at least two different data centers of the streaming platform.

Example 18: The system of any of examples 10 to 17, wherein the transmission to at least one data center of the at least two data centers occurs indirectly through another regional point of presence of the streaming platform.

Example 19: A non-transitory computer-readable medium comprising one or more computer-executable instructions that, when executed by at least one processor of a computing device, cause the computing device to: discover, based on user information, that an identity of a user generating a live broadcast is enabled for dual streaming; determine, based at least in part on available network bandwidth, that the live broadcast is authorized for dual streaming; and transmit separately, at least partly in response to the discovery and the determination, streams of the live broadcast to a plurality of different network nodes of a streaming platform.

Example 20, The non-transitory computer-readable medium of example 19, wherein the at least one processor corresponds to a processor of a recording device employed by the user to generate the live broadcast, and the computer-executable instructions further cause the at least one processor to: analyze a regional network bandwidth availability for the recording device, wherein the determination that the live broadcast is authorized for dual streaming is based at least in part on the regional network bandwidth availability.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive [data] to be transformed, transform the [data], output a result of the transformation to [perform a function], use the result of the transformation to [perform a function], and store the result of the transformation to [perform a function]. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
discovering, by a computer processor and based on user information, that an identity of a user generating a live broadcast is enabled for dual streaming, wherein the computer processor corresponds to a processor of a recording device employed by the user to generate the live broadcast;
analyzing, by the computer processor, regional network bandwidth availability for the recording device;
determining, by the computer processor, that the live broadcast is authorized for dual streaming based at least in part on the regional network bandwidth availability; and
transmitting separately, by the computer processor at least partly in response to the discovery and the determination, streams of the live broadcast to a plurality of different network nodes of a streaming platform.

2. The method of claim 1, further comprising:
identifying, by the computer processor at a start of the live broadcast, at least two different regional points of presence of a plurality of points of presence based on proximity thereof to the recording device in terms of network connectivity of a regional network connecting the recording device to the at least two different regional points of presence,
wherein the plurality of different network nodes corresponds to the at least two different regional points of presence.

3. The method of claim 1, further comprising:
discovering, by the computer processor based on communications with the streaming platform regarding at least one of streaming platform network bandwidth availability or streaming platform cloud compute resource availability, that the live broadcast is approved for dual streaming,
wherein the transmission occurs further in response to the approval based on the at least one of streaming platform network bandwidth availability or streaming platform cloud compute resource availability.

4. The method of claim 1, further comprising:
determining, by the computer processor, a user preference for dual streaming,
wherein the transmission occurs further in response to the user preference for dual streaming.

5. The method of claim 4, wherein the determination of the user preference corresponds to prompting the user for the user preference and storing the user preference for future reference.

6. A computer-implemented method comprising:
discovering, by a computer processor and based on user information, that an identity of a user generating a live broadcast is enabled for dual streaming, wherein the computer processor corresponds to a processor of a point of presence of a streaming platform;
receiving, by the computer processor, the live broadcast from a recording device over a regional network;
discovering, by the computer processor, streaming platform network bandwidth availability and cloud compute resource availability;
determining, by the computer processor, that the live broadcast is authorized for dual streaming based at least in part on the streaming platform network bandwidth availability and the cloud compute resource availability both being sufficient to support dual streaming; and
transmitting separately, by the computer processor at least partly in response to the discovery and the determination, streams of the live broadcast to a plurality of different network nodes of the streaming platform.

7. The method of claim 6, wherein the plurality of different network nodes of the streaming platform corresponds to at least two different data centers of the streaming platform.

8. The method of claim 7, wherein the transmission to at least one data center of the at least two data centers occurs indirectly through another regional point of presence of the streaming platform.

9. A system comprising:
at least one physical processor that corresponds to a processor of a recording device employed by a user to generate a live broadcast; and
physical memory comprising computer-executable instructions that, when executed by the physical processor, cause the physical processor to:
discover, based on user information, that an identity of the user generating the live broadcast is enabled for dual streaming;
analyze regional network bandwidth availability for the recording device;
determine that the live broadcast is authorized for dual streaming based at least in part on the regional network bandwidth availability; and
transmit separately, at least partly in response to the discovery and the determination, streams of the live broadcast to a plurality of different network nodes of a streaming platform.

10. The system of claim 9, wherein the computer-executable instructions further cause the at least one physical processor to:
identify, at a start of the live broadcast, at least two different regional points of presence of a plurality of points of presence based on proximity thereof to the recording device in terms of network connectivity of a regional network connecting the recording device to the at least two different regional points of presence,
wherein the plurality of different network nodes corresponds to the at least two different regional points of presence.

11. The system of claim 9, wherein the computer-executable instructions further cause the at least one physical processor to:
discover, based on communications with the streaming platform regarding at least one of streaming platform network bandwidth availability or streaming platform cloud compute resource availability, that the live broadcast is approved for dual streaming,
wherein the transmission occurs further in response to the approval based on the at least one of streaming platform network bandwidth availability or streaming platform cloud compute resource availability.

12. The system of claim 9, wherein the computer-executable instructions further cause the at least one physical processor to:
determine a user preference for dual streaming,
wherein the transmission occurs further in response to the user preference for dual streaming.

13. The system of claim 12, wherein the determination of the user preference corresponds to prompting the user for the user preference and storing the user preference for future reference.

14. A system comprising:
at least one physical processor that corresponds to a processor of a point of presence of a streaming platform; and
physical memory comprising computer-executable instructions that, when executed by the physical processor, cause the physical processor to:
  discover, based on user information, that an identity of a user generating a live broadcast is enabled for dual streaming;
  receive the live broadcast from a recording device over a regional network;
  discover streaming platform network bandwidth availability and cloud compute resource availability;
  determine that the live broadcast is authorized for dual streaming based at least in part on the streaming platform network bandwidth availability and the cloud compute resource availability both being sufficient to support dual streaming; and
  transmit separately, at least partly in response to the discovery and the determination, streams of the live broadcast to a plurality of different network nodes of a streaming platform.

15. The system of claim 14, wherein the plurality of different network nodes of the streaming platform corresponds to at least two different data centers of the streaming platform.

16. The system of claim 15, wherein the transmission to at least one data center of the at least two data centers occurs indirectly through another regional point of presence of the streaming platform.

17. A non-transitory computer-readable medium comprising one or more computer-executable instructions that, when executed by at least one processor of a recording device employed by a user to generate a live broadcast, cause the at least one processor to:
  discover, based on user information, that an identity of the user generating the live broadcast is enabled for dual streaming;
  analyze regional network bandwidth availability for the recording device,
  determine that the live broadcast is authorized for dual streaming based at least in part on the regional network bandwidth availability; and
  transmit separately, at least partly in response to the discovery and the determination, streams of the live broadcast to a plurality of different network nodes of a streaming platform.

18. The non-transitory computer-readable medium of claim 17, wherein the computer-executable instructions further cause the at least one processor to:
  identify, at a start of the live broadcast, at least two different regional points of presence of a plurality of points of presence based on proximity thereof to the recording device in terms of network connectivity of a regional network connecting the recording device to the at least two different regional points of presence,
  wherein the plurality of different network nodes corresponds to the at least two different regional points of presence.

19. A non-transitory computer-readable medium comprising one or more computer-executable instructions that, when executed by at least one processor of a point of presence of a streaming platform, cause the at least one processor to:
  discover, based on user information, that an identity of a user generating a live broadcast is enabled for dual streaming;
  receive the live broadcast from a recording device over a regional network;
  discover streaming platform network bandwidth availability and cloud compute resource availability;
  determine that the live broadcast is authorized for dual streaming based at least in part on the streaming platform network bandwidth availability and the cloud compute resource availability both being sufficient to support dual streaming; and
  transmit separately, at least partly in response to the discovery and the determination, streams of the live broadcast to a plurality of different network nodes of a streaming platform.

20. The non-transitory computer-readable medium of claim 19, wherein the plurality of different network nodes of the streaming platform corresponds to at least two different data centers of the streaming platform.

* * * * *